Sept. 5, 1939.  R. BERINGER  2,171,908
CLUTCH
Filed Nov. 13, 1937  2 Sheets-Sheet 1
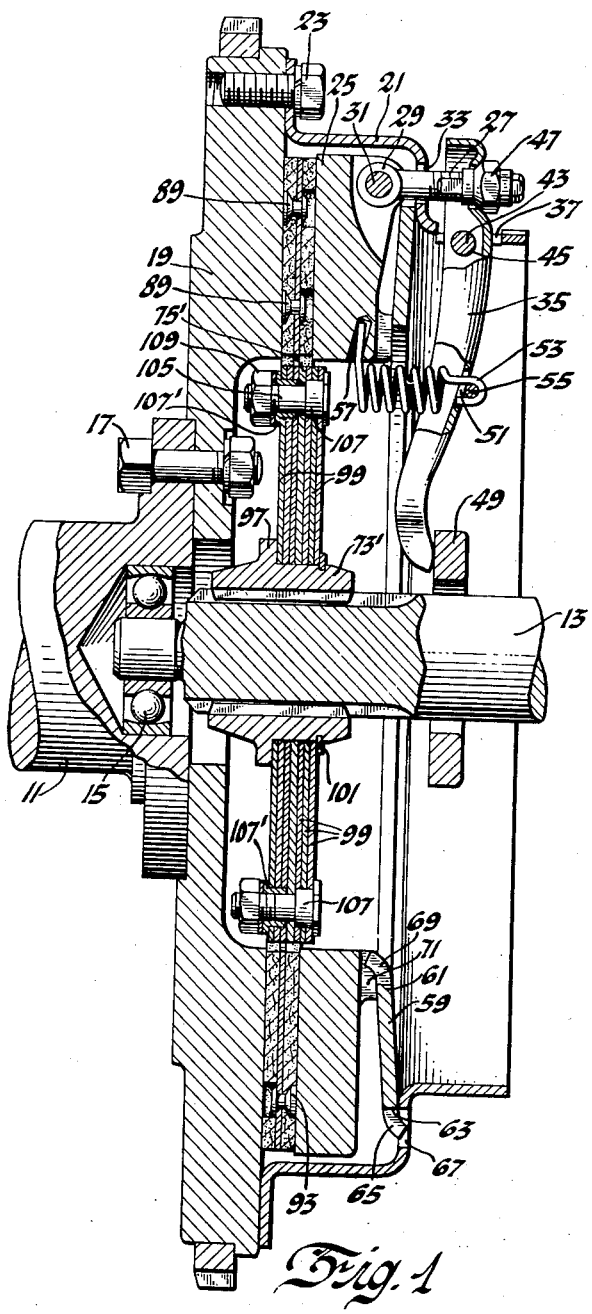
Fig. 1
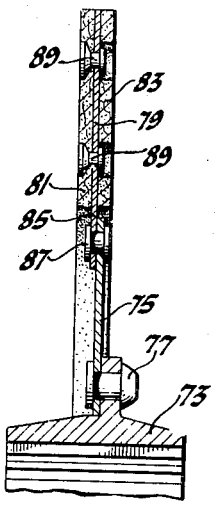
Fig. 4
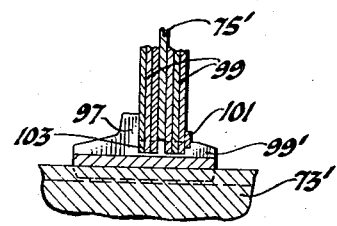
Fig. 2
Fig. 3
Inventor
Roscoe Beringer
By Blackmore, Spencer & Flint
Attorneys Sept. 5, 1939.  R. BERINGER  2,171,908
CLUTCH
Filed Nov. 13, 1937   2 Sheets-Sheet 2
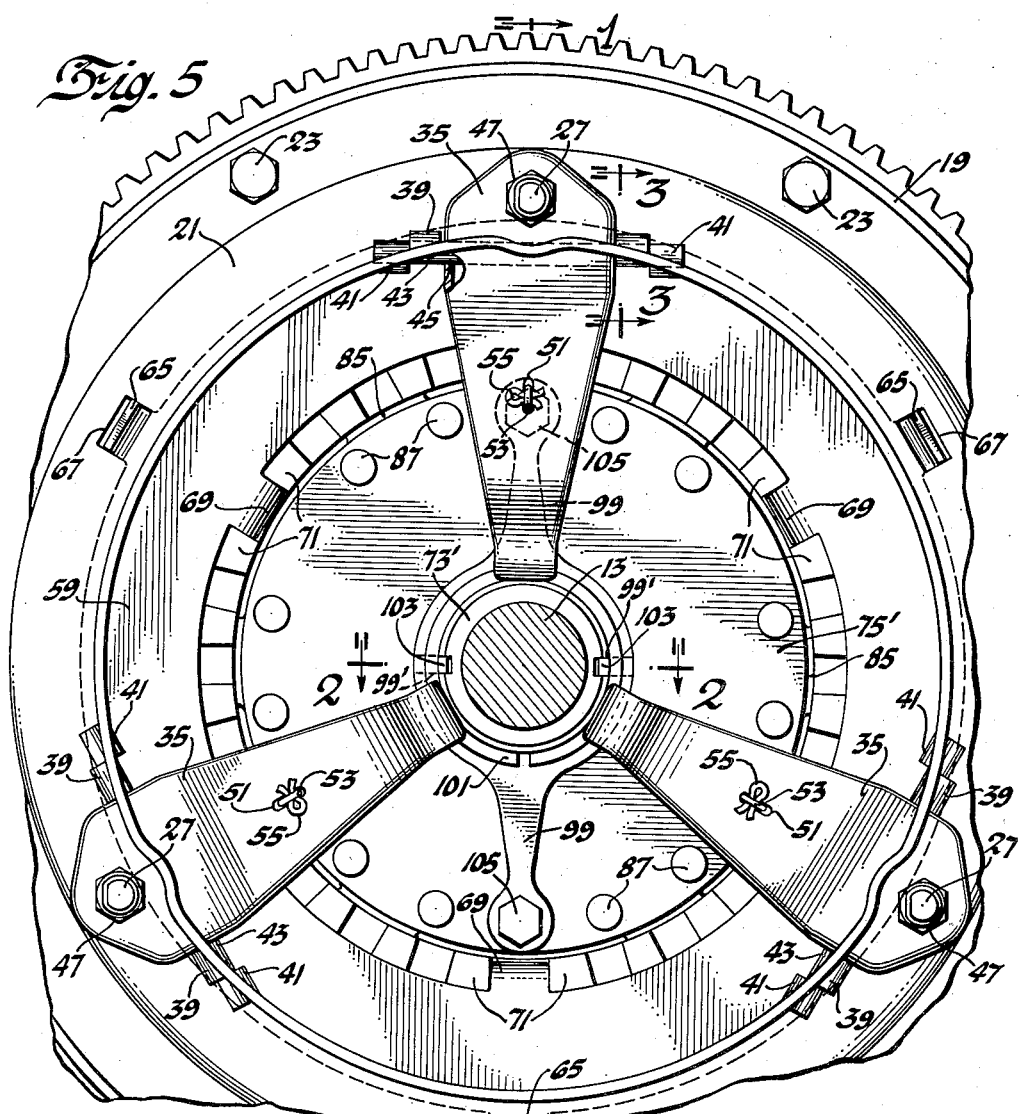
Fig. 5
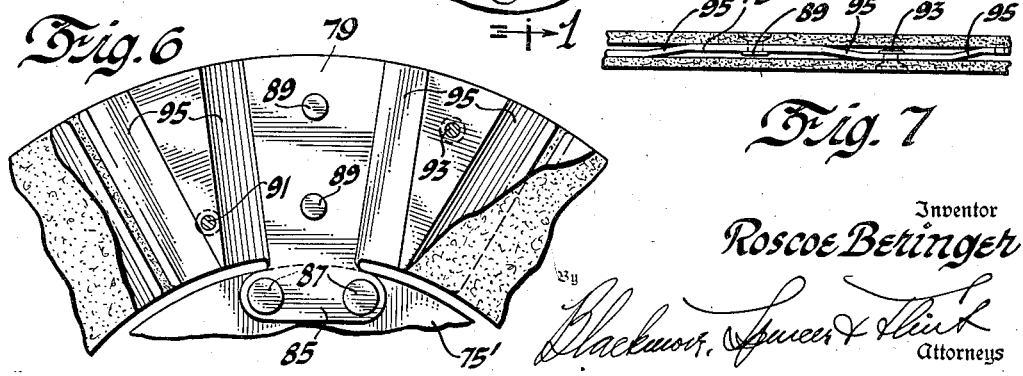
Fig. 6
Fig. 7
Inventor
Roscoe Beringer
By
Blackmore, Spencer & Flint
Attorneys Patented Sept. 5, 1939

2,171,908

UNITED STATES PATENT OFFICE 2,171,908

CLUTCH

Roscoe Beringer, Detroit, Mich., assignor to General Motors Corporation, Detroit, Mich., a corporation of Delaware Application November 13, 1937, Serial No. 174,397

5 Claims. (Cl. 192—68)

This invention relates to clutches and has been designed for use in motor vehicles between the engine shaft and the transmission shaft.

An object of the invention is to provide a novel form of clutch which shall be as free as possible from chatter. The provision of cushioning means on both sides of the driven plate constitutes a related and specific object.

Another and important object is the economy resulting from the use of less and cheaper material and in the reduction of spinning inertia, these characteristics being made possible partly because of the kind of clutch spring which is used.

A still further object is the simple and relatively inexpensive provision for preventing transmission of vibrations, the particular expedient having a vibration period higher than is generally used.

Other objects and advantages will appear from the following description.

The invention is illustrated by the accompanying drawings wherein:

Figure 1 is a section transversely through the clutch and longitudinally through the shafts, the section being marked by line 1—1 of Figure 5.

Figure 2 is a section on line 2—2 of Figure 5.

Figure 3 is a section on line 3—3 of Figure 5.

Figure 4 is a section corresponding to that of Figure 1 but showing a simpler form.

Figure 5 is a view in elevation from the right side of Figure 1.

Figure 6 is a view in elevation of the driven plate.

Figure 7 is an edge view of the driven plate shown by Figure 6.

Referring by reference characters to the drawings, numeral 11 is used to represent the engine shaft and 13 is the transmission shaft piloted into the end of shaft 11 by suitable bearings 15. The engine shaft has secured thereto by fastening means 17, a flywheel 19 to which is secured a cover 21 as at 23. This cover may be very simply and economically made from strip stock shaped as shown, rolled into circular form and with its mating edges welded together. The pressure plate for gripping the driven plate between itself and the flywheel is marked 25. A plurality of bolts 27 having eyes 29 are pivoted to the pressure plate by pins 31. The bolts extend through openings 33 in the cover plate. Levers 35 are pivoted to the cover 21. For this purpose the cover is formed with openings 37 for the passage of the levers and on each side of each opening the material of the cover is oppositely bent as at 39 and 41 to receive and support pivot pins 43 which pins pass through openings 45 in the side walls of the U-shaped levers 35. At its outer end each lever is depressed to seat a rounded nut 47 threaded on the eye bolt as shown by Figure 1. The levers extend radially inward to a point near shaft 13 where they are engaged by a reciprocable throwout collar 49. Each lever also has an opening 51 for the passage of a loop at the end of a coil spring 53. A cotter pin 55 passes through the loop and retains the spring in position relatively to the lever. The other end of the spring is tangentially extended, its extremity being projected into a hole 57 bored into the pressure plate. When the clutch is engaged, this spring keeps the inner end of the lever from noisy engagement with the collar 49.

The operating spring for the clutch takes the form of an annulus of spring steel which in its unstressed condition is slightly bowed into the form of a Belleville washer. This spring is marked on the drawings by numeral 59. When the clutch is engaged the spring is somewhat flattened. It exerts pressure on the pressure plate along the inner margin of the annulus as at 61. The reaction of the force transmitted to the pressure plate is along the circle of contact between the outer margin of the annulus and the cover plate, this region being marked 63. The spring is positioned by lugs extending outwardly from the outer margin and inwardly from the inner margin. These lugs may also transmit the driving torque between the flywheel cover plate and the pressure plate. Lugs 65 extend from the spring and engage openings 67 in the cover. Lugs 69 extend inwardly and engage notches 71 formed by lugs on the pressure plate.

In its simplest form, the invention may employ a driven plate such as is shown by Figure 4. In this embodiment a hub 73 is splined on the driven shaft 13. To the hub is fastened by rivets 77 an inner driven ring 75. To this inner ring near its outer margin are secured a plurality of segmental plates 79, these plates carrying riveted thereto linings 81 and 83. The segmental plates are shaped and secured as best shown by Figure 6. The segments have inner tabs 85 fastened by rivets 87 to ring 75. Each segment is formed with oppositely directed offset regions. The mid-portion of a segment is offset to one side (axially of the clutch) and one lining member is secured to the offset region by radially spaced rivets 89. The portions on either side of the mid portion are offset to the other side of the plane of the segment and to these offset regions the lining is secured by rivets 91 and 93. The angular regions such as 95 connect the oppositely offset portions. It will be understood that when the clutch is engaged the whole segment is pressed into the form of a plane, and by this action smooth clutch engagement is effected.

Instead of directly securing ring 75 to the hub as in Figure 4 its equivalent 75' may be secured to the hub as in Figure 1. In this figure the hub 73' is splined upon shaft 13. It has a radial flange 97 and diametrically opposite axial notches 99'. Plate 75' surrounds the hub but is not locked thereto. On each side of plate 75' are 3 flat spring tines 99. These tines are shaped as shown in Figure 5 and are held in position axially on the hub by the flange 97 and by a lock ring 101. Each of these tines extends diametrically to a position adjacent the margin of plate 75'. At the middle of its length it is of circular outline and surrounds the hub 73'. It is formed with diametrically opposite lugs 103 which are received within the notches 99'. The outer ends of the tines are secured to plate 75' by bolts 105. Each bolt has a shoulder 107 adjacent its head upon which shoulder are received three of the ends of the spring tines. A shouldered washer 107' adjacent the nut 109 receives the other three tines. The plate 75' is itself received on the bolt 105 between its shoulder and the washer 107'. In this form of the invention rivets 87 secure the same distorted segmental plates as before described to the plates 75'. The spring tines 99 are shaped to have as nearly as possible uniform stresses. They also have a higher frequency than somewhat analogous expedients have had whereby they may be more effective in absorbing vibratory periods.

The above described construction is intended to attain the several objects of invention enumerated above.

The provision of the offsets on both sides of the segmental plates will be more effective in eliminating chatter than in prior constructions having offsets on the pressure plate side only. Since it is impractical to make the flywheel face perfectly flat, driven plates with no cushioning on the flywheel side are likely to have a bodily longitudinal movement which movement causes chatter. Cushioning on both sides is intended to overcome this fault. Since the clutch spring pressure is distributed upon the pressure plate as it is, it is found possible to make the driven plate of less and cheaper material. The segments have low stresses and low carbon steel will be a satisfactory material. Such material is cheaper, more readily available and more economical to shape. Since there is but a single series of segments constituting the outer part of the driven plate less weight is involved than in those clutch installations where a double plate is used. The reduction of weight results in a reduced spinning inertia. Such a construction also facilitates transmission synchronism. It may also be mentioned that a coned annular clutch spring such as spring 59 may have a substantially zero rate with the result that the resilient reaction on the pedal when the clutch is being released varies but little throughout the whole range of movement. The high frequency insulator constituted by the assembly of spring tines constitutes a marked improvement over other devices heretofore used for damping out vibratory movements. The simple expedient for locking the spring tines to the hub is to be noted. The location of the anchoring points may be so selected as to control the characteristics of the vibration eliminator.

I claim:

1. In a clutch, a driven plate, said plate comprising a hub, an inner ring, means to secure said inner rig to said hub, a plurality of segments having tabs secured to the outer margin of said inner ring, each segment having portions parallel to each other and offset on opposite sides of a middle plane, and friction facings secured to said offset portions, said inner ring securing means comprising a plurality of spring tines, said tines having a midlength part of circular outline surrounding and anchored to said hub and parts extending diametrically from said hub and terminally secured to the outer margin of said inner ring.

2. In a clutch, a driven plate, said plate comprising a hub, an inner ring, means to secure said innner ring to said hub, a plurality of segments having tabs secured to the outer margin of said inner ring, each segment having portions parallel to each other and offset on opposite sides of a middle plane, and friction facings secured to said offset portions, said inner ring securing means comprising a plurality of overlapping spring tines, said tines extending diametrically in opposite directions from central circular portions which surround and are anchored to said hub, the ends of said spring tines being terminally secured to the outer margin of said inner ring.

3. In a clutch, a driven plate, said plate comprising a hub, an inner ring, means to secure said inner ring to said hub, a plurality of segments having tabs secured to the outer margin of said inner ring, each segment having portions parallel to each other and offset on opposite sides of a middle plane, and friction facings secured to said offset portions, said inner ring securing means comprising a plurality of spring tines, each of said tines having a midlength part of circular outline surrounding and anchored to said hub and parts extending diametrically from said hub terminally secured to the outer margin of said inner ring, there being a plurality of said spring tines on each side of said inner ring.

4. In a clutch, a flywheel, a cover secured thereto, a driven plate and a pressure plate within said cover, a coned spring annulus engaging said pressure plate along one of its circular margins and yieldingly pressing said pressure plate toward said flywheel to thereby grip the driven plate, said cover serving as a reaction abutment and engaging the cone spring annulus, along its other circular margin, said spring annulus being circumferentially continuous between its regions of engagement with the pressure plate and cover, said cover having an axial extension having openings formed therein, radially extending levers projected through said openings and pivoted to the cover adjacent said openings, means connecting the outer ends of said levers to said pressure plate and means to operably engage the inner ends of said levers.

5. In a clutch, a flywheel, a cover secured thereto, a driven plate and a pressure plate within said cover, a coned spring annulus engaging said pressure plate along one of its circular margins and yieldingly pressing said pressure plate toward said flywheel to thereby grip the driven plate, said cover serving as a reaction abutment and engaging the cone spring annulus along its other circular margin, said cover having an axial extension having openings formed therein, radially extending levers projected through said openings and pivoted to the cover adjacent said openings, means connecting the outer ends of said levers to said pressure plate and means to operably engage the inner ends of said levers, said coned spring having lugs extending from its margins to interlock with said cover and said pressure plate, the connecting means between the levers and the pressure plate extending through openings in the cover.

ROSCOE BERINGER.